(12) United States Patent
Kim et al.

(10) Patent No.: US 12,066,723 B2
(45) Date of Patent: Aug. 20, 2024

(54) DISPLAY PANEL AND DISPLAY DEVICE

(71) Applicant: TCL China Star Optoelectronics Technology Co., Ltd., Guangdong (CN)

(72) Inventors: Jiha Kim, Guangdong (CN); Bin Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/611,605

(22) PCT Filed: Oct. 11, 2021

(86) PCT No.: PCT/CN2021/122959
§ 371 (c)(1),
(2) Date: Mar. 30, 2023

(87) PCT Pub. No.: WO2023/044973
PCT Pub. Date: Mar. 30, 2023

(65) Prior Publication Data
US 2024/0045281 A1 Feb. 8, 2024

(30) Foreign Application Priority Data
Sep. 27, 2021 (CN) .......................... 202111138360.4

(51) Int. Cl.
*G02F 1/1343* (2006.01)
*G02F 1/1333* (2006.01)
(Continued)

(52) U.S. Cl.
CPC .. *G02F 1/134372* (2021.01); *G02F 1/133345* (2013.01); *G02F 1/13394* (2013.01);
(Continued)

(58) Field of Classification Search
None
See application file for complete search history.

(56) References Cited

U.S. PATENT DOCUMENTS 10,018,877 B2 * 7/2018 Cho .................... G02F 1/13394
10,732,465 B2 8/2020 Mibu
(Continued)

FOREIGN PATENT DOCUMENTS

| CN | 102998867 | 3/2013 |
|---|---|---|
| CN | 103869563 | 6/2014 |

(Continued)

OTHER PUBLICATIONS

Notice of Reasons for Refusal Dated Feb. 5, 2024 From the Japan Patent Office Re. Application No. 2021-562385 and Its Translation Into English. (12 Pages).

(Continued)

*Primary Examiner* — Ryan Crockett

(57) ABSTRACT

The present application provides a display panel and a display device. The display panel includes: thin film transistors arranged on the first substrate; a common electrode layer arranged on the thin film transistors; auxiliary conductive patterns disposed on the common electrode layer and connected to the common electrode layer; a pixel electrode layer electrically insulated from the common electrode layer and the auxiliary conductive patterns; and spacers arranged between the first substrate and the second substrate and staggered with respect to the auxiliary conductive patterns.

17 Claims, 7 Drawing Sheets

(51) Int. Cl.
  *G02F 1/1339* (2006.01)
  *G02F 1/1362* (2006.01)
  *G02F 1/1368* (2006.01)

(52) U.S. Cl.
  CPC .. *G02F 1/134345* (2021.01); *G02F 1/136227* (2013.01); *G02F 1/136286* (2013.01); *G02F 1/1368* (2013.01)

(56) References Cited

U.S. PATENT DOCUMENTS

| | | | | |
|---|---|---|---|---|
| 10,747,064 | B2* | 8/2020 | Cho | G02F 1/136286 |
| 2008/0204648 | A1 | 8/2008 | Tanaka et al. | |
| 2014/0168554 | A1* | 6/2014 | Son | G02F 1/13394 |
| | | | | 257/72 |
| 2015/0253607 | A1 | 9/2015 | Cho | |
| 2016/0018708 | A1* | 1/2016 | Kanda | G02F 1/133512 |
| | | | | 257/254 |
| 2016/0246098 | A1* | 8/2016 | Han | G02F 1/13394 |
| 2016/0320673 | A1* | 11/2016 | Jung | G02F 1/134309 |
| 2016/0370636 | A1* | 12/2016 | Huang | H01L 27/1225 |
| 2017/0153480 | A1* | 6/2017 | Lv | G02F 1/133514 |
| 2018/0120619 | A1* | 5/2018 | Cho | G02F 1/13394 |
| 2019/0204698 | A1* | 7/2019 | Wang | G02F 1/13394 |
| 2021/0135149 | A1* | 5/2021 | Xin | H10K 59/1315 |
| 2021/0232011 | A1* | 7/2021 | He | G02F 1/136286 |

FOREIGN PATENT DOCUMENTS

| | | |
|---|---|---|
| CN | 205827025 | 12/2016 |
| CN | 208111444 | 11/2018 |
| CN | 109254455 | 1/2019 |
| CN | 109524443 | 3/2019 |
| CN | 109599502 | 4/2019 |
| CN | 110752243 | 2/2020 |
| CN | 112071891 | 12/2020 |
| JP | 2004-245872 | 9/2004 |
| JP | 2008-209686 | 9/2008 |
| JP | 2018-072824 | 5/2018 |
| JP | 2019-090979 | 6/2019 |
| KR | 10-2007-0068577 | 7/2007 |
| KR | 10-2014-0119913 | 10/2014 |

OTHER PUBLICATIONS

Notice of Reasons for Refusal Dated Jun. 3, 2024 From the Japan Patent Office Re. Application No. 2021-562385 and Its Translation Into English. (9 Pages).

* cited by examiner

US 12,066,723 B2

DISPLAY PANEL AND DISPLAY DEVICE

RELATED APPLICATIONS

This application is a National Phase of PCT Patent Application No. PCT/CN2021/122959 having International filing date of Oct. 11, 2021, which claims the benefit of priority of Chinese Patent Application No. 202111138360.4 filed on Sep. 27, 2021. The contents of the above applications are all incorporated by reference as if fully set forth herein in their entirety.

FIELD AND BACKGROUND OF THE INVENTION

The present application relates to a field of display technology and in particular, to a display panel and a display device.

In conventional FFS display panel, resistance of the planar common electrode needs to be reduced to alleviate an uneven brightness problem among different areas of the display panel caused by excessively high resistance of the common electrode. Accordingly, the resistance of the conventional planar common electrode is reduced by adding a metal pattern connected to the planar common electrode. However, there is a significant level difference between an area where the metal pattern is added and an area without the metal pattern. As a result, spacers located between upper and lower substrates are easily shifted and misaligned where the level difference located under an action of external force, thereby affecting normal display of the display panel.

SUMMARY OF THE INVENTION

The present application provides a display panel and a display device, which can effectively solve a problem of shifting and misalignment of spacers where a level difference located under an action of the external force in conventional techniques.

The present application provides a display panel, comprising:
  a first substrate and a second substrate arranged opposite to each other;
  a plurality of thin film transistors arranged on the first substrate;
  a common electrode layer arranged on the thin film transistors;
  a plurality of auxiliary conductive patterns disposed on the common electrode layer, wherein the auxiliary conductive patterns are connected to the common electrode layer;
  a pixel electrode layer electrically insulated from the common electrode layer and the auxiliary conductive patterns, wherein the pixel electrode layer is connected to the thin film transistors; and
  a plurality of spacers arranged between the first substrate and the second substrate, wherein the spacers are staggered with respect to the auxiliary conductive patterns.

Optionally, in some embodiments of the present application, the display panel further comprises:
  a passivation layer disposed on the common electrode layer and the auxiliary conductive patterns, wherein the passivation layer covers the common electrode layer and the auxiliary conductive patterns, and the pixel electrode layer is disposed on the passivation layer; and
  wherein orthographic projections of the spacers projected on the passivation layer are located outside orthographic projections of the auxiliary conductive patterns projected on the passivation layer.

Optionally, in some embodiments of the present application, a plurality of scan lines and a plurality of data lines are disposed on the first substrate, the scan lines and the data lines cross each other to define a plurality of sub-pixel regions, the pixel electrode layer comprises a plurality of pixel electrodes in the sub-pixel regions, a gate of each thin film transistor is connected to the corresponding scan line, a source of each thin film transistor is connected to the corresponding data line, and a drain of each thin film transistor is connected to the corresponding pixel electrode; and
  wherein orthographic projections of the auxiliary conductive patterns projected on the first substrate are located outside orthographic projections of the pixel electrodes projected on the first substrate.

Optionally, in some embodiments of the present application, each of the auxiliary conductive patterns comprises a trunk portion extending along an extending direction of the data lines, and each of the trunk portions covers at least a portion of the adjacent data line.

Optionally, in some embodiments of the present application, each of the auxiliary conductive patterns further comprises an extension portion extending along an extending direction of the scan lines, the extension portions are connected to the trunk portions, each extension portion covers at least a portion of the adjacent scan line, and the auxiliary conductive patterns and the spacers are alternately arranged along the extending direction of the scan lines.

Optionally, in some embodiments of the present application, the spacers are arranged corresponding to the thin film transistors, and the extension portions and the spacers are alternately arranged along the extending direction of the data lines.

Optionally, in some embodiments of the present application, 2n sub-pixels are arranged between two adjacent trunk portions along the extending direction of the scan lines, a width of each extension portion is greater than a sum of widths of (n−1) sub-pixel regions, and the width of each extension portion is less than a sum of widths of (n+1) sub-pixel regions.

Optionally, in some embodiments of the present application, auxiliary conductive patterns comprise:
  a plurality of first trunk portions and a plurality of second trunk portions extending along an extending direction of the data lines, wherein the first trunk portions and the second trunk portions are arranged adjacent to each other; and
  a plurality of first extension portions and a plurality of second extension portions extending along an extending direction of the scan lines, wherein one end of each first extension portion is connected to the corresponding first trunk portion, a free end of each first extension portion extends toward the corresponding second trunk portion, one end of each second extension portion is connected to the corresponding second trunk portion, and a free end of each second extension portion extends towards the corresponding first trunk portion; and
  wherein four sub-pixels are arranged between each first trunk portion and the corresponding second trunk portion along the extending direction of the scan lines, and the four sub-pixels comprise a first sub-pixel, a second sub-pixel, a third sub-pixel, and a fourth sub-pixel arranged in sequence between each first trunk portion and the corresponding second trunk portion; a polarity of a driving voltage applied on the first sub-pixel and the second sub-pixel is opposite to a polarity of a driving voltage applied on the third sub-pixel and the fourth sub-pixel; and the free ends of the first extension portions and/or the free ends of the second extension portions do not extend beyond the data lines located between the second sub-pixels and the third sub-pixels in the extending direction of the scan lines.

Optionally, in some embodiments of the present application, the auxiliary conductive patterns comprise:

a plurality of first trunk portions and a plurality of second trunk portions extending along an extending direction of the data lines, wherein the first trunk portions and the second trunk portions are arranged adjacent to each other;

a plurality of first extension portions and a plurality of second extension portions extending along an extending direction of the scan lines, wherein one end of each first extension portion is connected to the corresponding first trunk portion, a free end of each first extension portion extends toward the corresponding second trunk portion, one end of each second extension portion is connected to the corresponding second trunk portion, and a free end of each second extension portion extends toward the corresponding first trunk portion;

wherein six sub-pixels are arranged between each first trunk portion and the corresponding second trunk portion along the extending direction of the scan lines, and the six sub-pixels comprise a first sub-pixel, a second sub-pixel, a third sub-pixel, a fourth sub-pixel, a fifth sub-pixel, and a sixth sub-pixel arranged in sequence between each first trunk portion and the corresponding second trunk portion; a polarity of a driving voltage applied to the first sub-pixel, the second sub-pixel, and the third sub-pixel is opposite to a polarity of a driving voltage applied to the fourth sub-pixel, the fifth sub-pixel, and the sixth sub-pixel; and the free ends of the first extension portions and/or the free ends of the second extension portions do not extend beyond the data lines located between the third sub-pixels and the fourth sub-pixels in the extending direction of the scan lines.

Optionally, in some embodiments of the present application, the auxiliary conductive patterns comprise:

a plurality of first extension portions and a plurality of second extension portions extending in a first direction; and a plurality of first trunk portions and a plurality of second trunk portions extending in a second direction, wherein the first trunk portions and the second trunk portions are disposed adjacent to each other, and the first direction and the second direction crosses each other; and wherein one end of each first extension portion is connected to the corresponding first trunk portion, and another end of each first extension portion is close to and disconnected from the corresponding second trunk portion; one end of each second extension portion is connected to the corresponding second trunk portion, and another end of the second extension portion is close to and disconnected from the corresponding first trunk portion; and the first extension portions and the second extension portions are alternately arranged along the second direction.

Optionally, in some embodiments of the present application, an orthographic projection of each of the spacers projected on a plane where the auxiliary conductive patterns are disposed is located between a free end of the corresponding first extension portion and the corresponding second trunk portion; and/or an orthographic projection of each of the spacers projected on the plane where the auxiliary conductive patterns are disposed is located between a free end of the corresponding second extension portion and the corresponding first trunk portion.

Optionally, in some embodiments of the present application, the display panel comprises a display area and a non-display area, and the auxiliary conductive patterns comprise:

a plurality of auxiliary conductive lines located in the display area, wherein the auxiliary conductive lines extend along a first direction and/or a second direction, and the first direction crosses the second direction; and a connection bus line disposed in the non-display area, wherein the connection bus line is connected to the auxiliary conductive lines.

The present application further comprises a display device, comprising a backlight module and the display panel mentioned above, wherein the display panel is connected to the backlight module.

Advantages of the present application: The spacers are staggered with respect to the auxiliary conductive patterns to ensure that the orthographic projections of the spacers projected on the plane where the auxiliary conductive patterns are disposed do not overlap with the auxiliary conductive patterns, thereby preventing the spacers from shifting and misalignment where level differences located at edges of the auxiliary conductive patterns, thus improving display reliability of the display panel.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DESCRIPTION OF SPECIFIC EMBODIMENTS OF THE INVENTION

The technical solutions of the present application will be clearly and completely described below in conjunction with the drawings with reference to specific embodiments of the present application. Obviously, the embodiments are only some of the embodiments of the present application, rather than all the embodiments. Based on the embodiments in the present application, all other embodiments obtained by those skilled in the art without creative work shall be deemed to fall within the protection scope of the present application.

The present application provides a display panel. The display panel comprises a first substrate and a second substrate which are arranged opposite to each other. The display panel further comprises: a plurality of thin film transistors arranged on the first substrate; a common electrode layer arranged on the thin film transistors; a plurality of auxiliary conductive patterns disposed on the common electrode layer; a pixel electrode layer electrically insulated from the common electrode layer and the auxiliary conductive patterns; and a plurality of spacers arranged between the first substrate and the second substrate. The auxiliary conductive patterns are connected to the common electrode layer. The pixel electrode layer is connected to the thin film transistors. The spacers are staggered with respect to the auxiliary conductive patterns. That is to say, orthographic projections of the spacers projected on a plane where the auxiliary conductive patterns are disposed are located outside the auxiliary conductive patterns.

Referring to FIGS. 1 to 6, a display panel is provided according to a first embodiment of the present application. The display panel comprises a first substrate 1 and a second substrate 2 disposed opposite to each other. The display panel comprises a display area S1 and a non-display area S2 located outside the display area S1.

Figure 1:
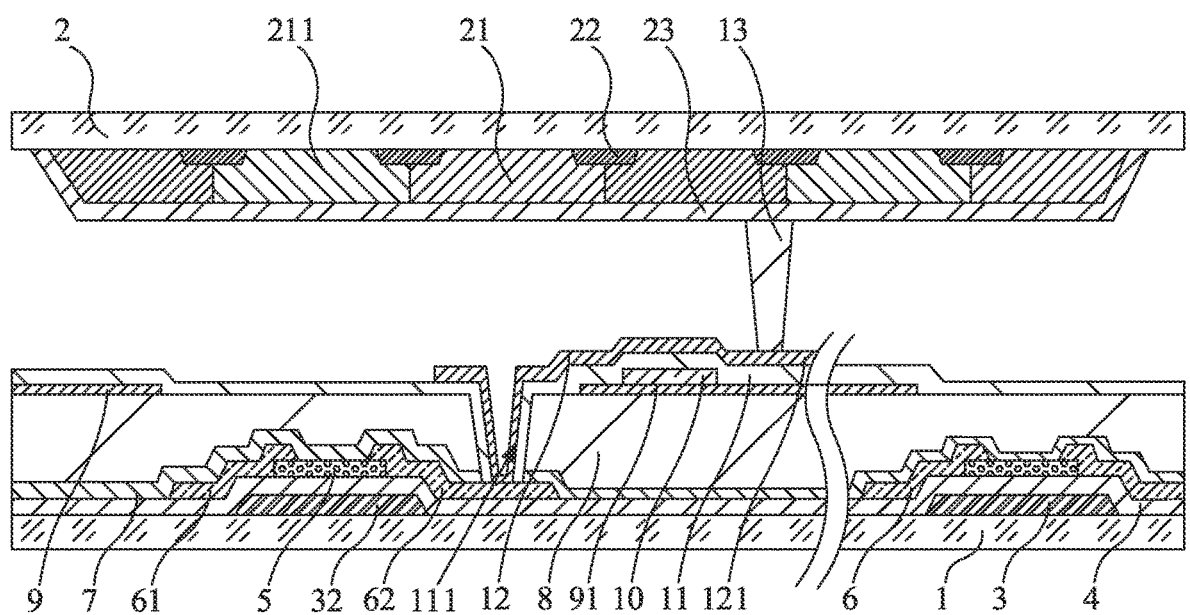
FIG. 1 is a schematic cross-sectional view illustrating a display area of a display panel according to a first embodiment of the present application.

As shown in FIG. 1, the display panel comprises a first metal layer 3, a first insulating layer 4, an active layer 5, a second metal layer 6, a second insulating layer 7, a planarization layer 8, a common electrode layer 9, a plurality of auxiliary conductive patterns 10, a passivation layer 11, a pixel electrode layer 12, and a first alignment layer (not illustrated) sequentially disposed on a first substrate 1.

The first substrate 1 is an array substrate. The first substrate 1 is a rigid substrate. The rigid first substrate 1 can be made of glass. It can be understood that the first substrate 1 can also be a flexible substrate. The flexible first substrate 1 can be made of organic insulating materials such as polyimide (PI) and/or polyethylene terephthalate (PET) that can prevent entry of moisture and oxygen, but the present application is not limited in this regard.

The first metal layer 3 is disposed on the first substrate 1. The first metal layer 3 forms a plurality of scan lines 31, gates 32 of thin film transistors, and storage electrodes (not illustrated) through a patterning process. The first metal layer 3 can be made of one or more of common conductive metals such as Mo, Al, Ti, and Cu or alloys thereof. The first metal layer 3 can be a single-layer conductive layer structure composed of a single metal, or a multi-layer conductive layer structure composed of multiple metals, and the present application is not limited in this regard.

The first insulating layer 4 is disposed on the first metal layer 3. The first insulating layer 4 covers the gate 32. The first insulating layer 4 is generally formed by deposition or sputtering of one or more of common inorganic materials such as SiNx, SiOx, and Al$_2$O$_3$, which can prevent entry of moisture and oxygen. Generally, a single-layer insulating layer can meet requirements for production yields of the display panel. However, in the display panel that uses polysilicon or metal oxide as an active layer, a structure of multiple insulating layers can also be used to effectively prevent entry of moisture and oxygen in order to improve the production yields. In the present embodiment, the first insulating layer 4 is a single-layer structure of SiOx or SiNx.

The active layer 5 is disposed on the first insulating layer 4. The active layer 5 can be made of common semiconductor materials such as metal oxide, amorphous silicon, and polysilicon. The active layer 5 is arranged corresponding to a middle area of the gate 32.

The second metal layer 6 is disposed on the active layer 5. The second metal layer 6 forms sources 61 and drains 62 of the thin film transistors and forms a plurality of data lines 63 through a patterning process. The source 61 and the drain 62 are directly connected to two ends of the active layer 5 or indirectly connected by using an ohmic contact layer. The second metal layer 6 can be made of one or more of common conductive metals such as Mo, Al, Ti, and Cu, or alloys thereof. The second metal layer 6 can be a single-layer conductive layer structure composed of a single metal, or can be a multi-layer conductive layer structure composed of multiple metals; however, the present application is not limited in this regard.

The second insulating layer 7 is disposed on the second metal layer 6. The second insulating layer 7 covers the source 61, the drain 62, and the data line 63. The second insulating layer 7 is generally formed by depositing or sputtering one or more of common inorganic materials such as SiNx, SiOx, Al$_2$O$_3$, which can prevent entry of moisture and oxygen. Generally, a single-layer insulating layer can meet requirements for production yields of the display panel. However, in the display panel that uses polysilicon or metal oxide as the active layer, a structure of multiple insulating layers can also be used to effectively prevent entry of moisture and oxygen in order to improve the production yields. In the present embodiment, the second insulating layer 7 is a single-layer structure of SiOx or SiNx.

The planarization layer 8 is disposed on the second insulating layer 7. The planarization layer 8 is made of an organic insulating material to obtain a flat surface, which is beneficial to subsequent production of the common electrode layer 9.

The common electrode layer 9 is disposed on the planarization layer 8. The common electrode layer 9 is generally made of ITO. The common electrode layer 9 can form a plurality of planar common electrodes 91 through a patterning process. It can be understood that the common electrode layer 9 can also be laid on an entire surface of the first substrate 1.

The auxiliary conductive patterns 10 are directly disposed on the common electrode layer 9. The auxiliary conductive patterns 10 are mostly made of a material whose conductivity is significantly greater than conductivity of the common electrode layer 9. The auxiliary conductive pattern 10 can be made of metal materials such as copper, aluminum, and silver. A connection between the auxiliary conductive patterns 10 and the common electrode layer 9 can significantly reduce resistance of the common electrode layer 9. Evenly distributing the auxiliary conductive patterns 10 on surfaces of the common electrodes 91 can effectively improve uniformity of a voltage of the common electrode layer 9 and alleviate an IR-drop of the panel.

The passivation layer 11 is disposed on the common electrode layer 9 and the auxiliary conductive patterns 10. The passivation layer 11 covers the common electrode layer 9 and the auxiliary conductive patterns 10. The passivation layer 11 mostly uses common inorganic insulating materials such as SiNx and/or SiOx. The passivation layer 11 is provided with a plurality of first via holes 111 penetrating the passivation layer 11, the planarization layer 8, and the second insulating layer 7. The first via hole 111 exposes a surface of the drain 62.

The pixel electrode layer 12 is disposed on the passivation layer 11. The pixel electrode layer 12 is electrically insulated from the common electrode layer 9 and the auxiliary conductive patterns 10 by means of the passivation layer 11. The pixel electrode layer 12 comprises a plurality of pixel electrodes 121. The pixel electrodes 121 are connected to the drains 62 through the first via holes 111. The display panel in the present embodiment is an FFS display panel. The planar common electrodes 91 and the patterned pixel electrodes 121 are stacked on each other in a vertical direction to generate a horizontal fringe electric field to drive liquid crystals to rotate. In order to ensure display quality, the planarization layer 8 needs to be disposed under the common electrodes 91 to ensure that the common electrodes 91 are formed on a same horizontal plane as possible.

A first alignment layer is disposed on the pixel electrode layer 12 to adjust rotation angles of the liquid crystals.

The display panel further comprises a second substrate 2 and a color filter layer 21, a light shielding layer 22, a third insulating layer 23, and a second alignment layer (not illustrated) disposed on the second substrate 2.

The second substrate 2 is arranged opposite to the first substrate 1. A material of the second substrate 2 is same as a material of the first substrate 1, and a detailed description thereof is omitted herein for brevity.

The color filter layer 21 comprises a plurality of filters 211. Each filter 211 is disposed in one corresponding sub-pixel area. The filter 211 is arranged corresponding to the pixel electrode 121.

The light shielding layer 22 is disposed between two adjacent filters 211 to avoid color mixing. The light shielding layer 22 is generally made of a black resin material.

The third insulating layer 23 covers the color filter layer 21 and the light shielding layer 22. The third insulating layer 23 mostly uses common inorganic insulating materials such as SiNx and/or SiOx. It can be understood that in some embodiments, the third insulating layer 23 on the second substrate 2 can be omitted, and the present application is not limited in this regard.

The second alignment layer covers the third insulating layer 23 to adjust the rotation angles of the liquid crystals.

The display panel further comprises a liquid crystal layer (not illustrated) and a plurality of spacers 13 disposed between the first substrate 1 and the second substrate 2.

The spacers 13 have a pillar shape, a spherical shape, or a disc shape. The spacers 13 are used to maintain a distance between the first substrate 1 and the second substrate 2. In the present embodiment, the spacers 13 are staggered with respect to the auxiliary conductive patterns 10. In other words, orthographic projections of the spacers 13 projected on a plane where the auxiliary conductive patterns 10 are disposed do not overlap with the auxiliary conductive patterns 10. That is to say, the orthographic projections of the spacers 13 projected on the plane where the auxiliary conductive patterns 10 are disposed are located outside the auxiliary conductive patterns 10. The spacers 13 are staggered with respect to the auxiliary conductive patterns 10 to prevent the spacers 13 from shifting and misalignment where level differences located at edges of the auxiliary conductive patterns 10, thereby improving display reliability of the display panel.

Figure 2:
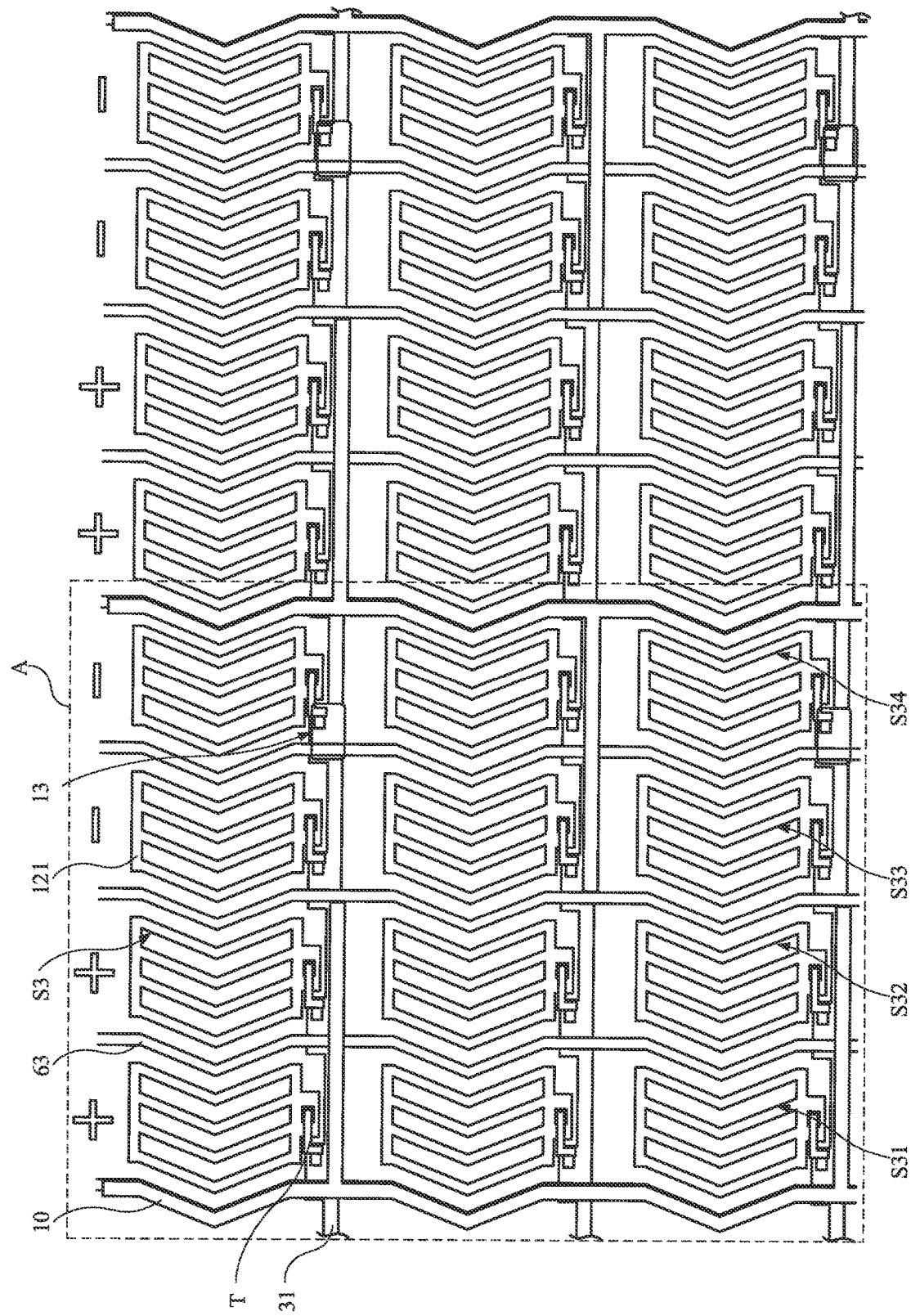
FIG. 2 shows a schematic top view illustrating the display area of the display panel in FIG. 1.
Figure 3:
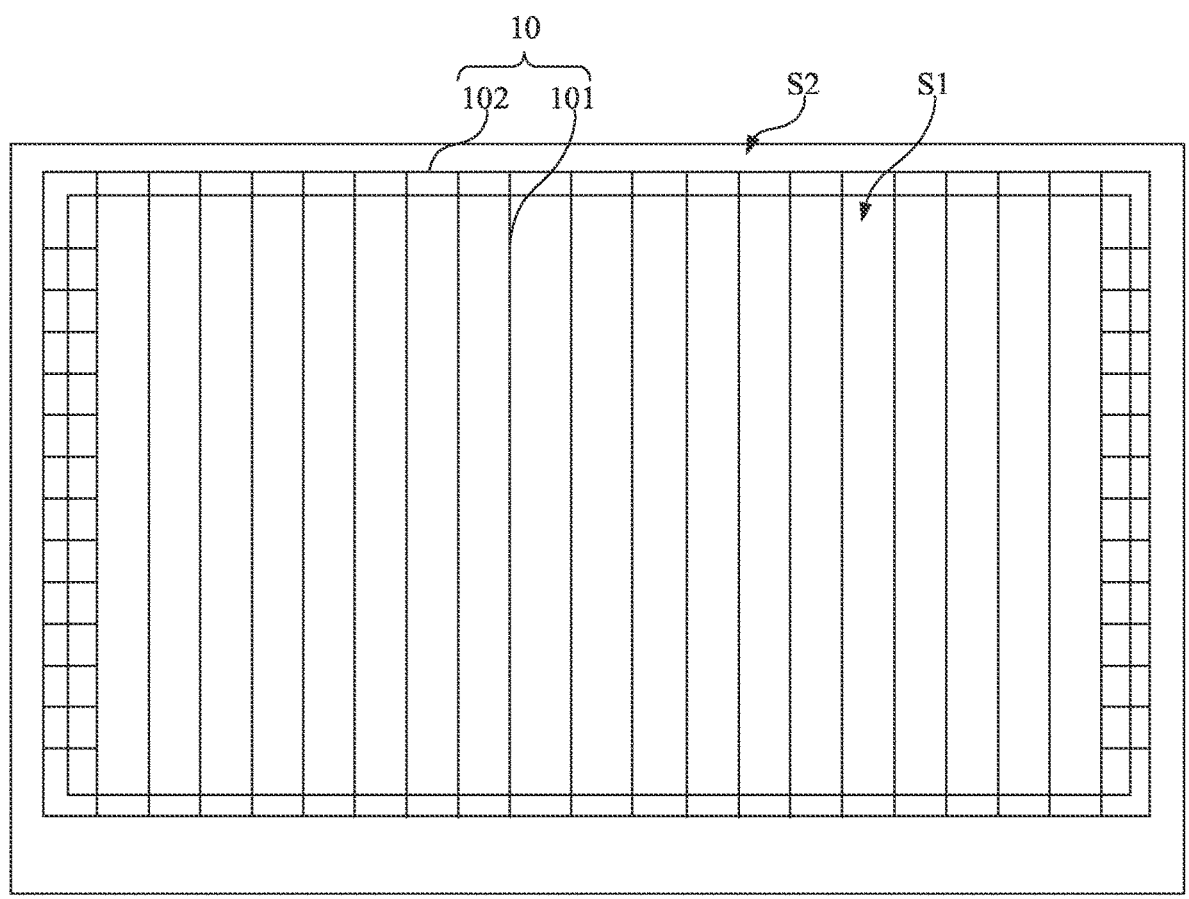
FIG. 3 shows a schematic view illustrating a connection manner of auxiliary conductive patterns in FIG. 1.

Referring to FIGS. 2 and 3, a display area S1 of the display panel is provided with the plurality of scan lines 31 extending in a first direction and the plurality of data lines 63 extending substantially in a second direction. The scan line 31 and the data line 63 cross each other to define a plurality of sub-pixel regions S3 arranged in an array. The pixel electrodes 121 obtained by patterning the pixel electrode layer 12 are disposed in the sub-pixel regions S3, respectively.

A thin film transistor T comprises the gate 32 disposed on the first metal layer 3, the first insulating layer 4 disposed on the first metal layer 3, the active layer 5 disposed on the first insulating layer 4, and the source 61 and the drain 62 of the second metal layer 6. The gate 32 of the thin film transistor T is connected to the scan line 31. In the present embodiment, the thin film transistor T uses a portion of the scan line 31 as the gate 32. The source 61 of the thin film transistor T is connected to the data line 63 to receive driving voltage signals of the data line 63. The drain 62 of the thin film transistor T is connected to the pixel electrode 121 to transmit the received driving voltage signals to the pixel electrode 121. The planarization layer 8 and the common electrodes 91 disposed above the thin film transistors T are laid on an entire surface area, which is not illustrated in FIG. 2.

The auxiliary conductive patterns 10 are made of metal in the present embodiment. The auxiliary conductive patterns 10 are directly disposed on the common electrodes 91 and connected to the common electrodes 91 to improve uniformity of voltages on the common electrodes 91. The auxiliary conductive patterns 10 are staggered with respect to the pixel electrodes 121. In other words, the auxiliary conductive patterns 10 do not overlap the pixel electrodes 121. That is, orthographic projections of the auxiliary conductive patterns 10 projected on the first substrate 1 are located outside orthographic projections of the pixel electrodes 121 projected on the first substrate 1 to minimize an influence of the auxiliary conductive patterns 10 on an aperture ratio and the normal display quality of the display panel.

Specifically, as shown in FIG. 3, a portion of the auxiliary conductive patterns 10 is located in the display area S1 and includes a plurality of auxiliary conductive lines 101. The auxiliary conductive lines 101 extend along the first direction and/or the second direction. That is, the auxiliary conductive line 101 has a portion extending along the scan line 31 and/or the data line 63 to maximize the aperture ratio. The portion of the auxiliary conductive pattern 10 located in the non-display area S2 includes the connection bus line 102. The connection bus line 102 is connected to the auxiliary conductive lines 101, and the auxiliary conductive lines 101 are evenly spaced along the first direction and the second direction to ensure that the voltages of the common electrodes 91 in the display area S1 are stable and more uniform.

Figure 4:
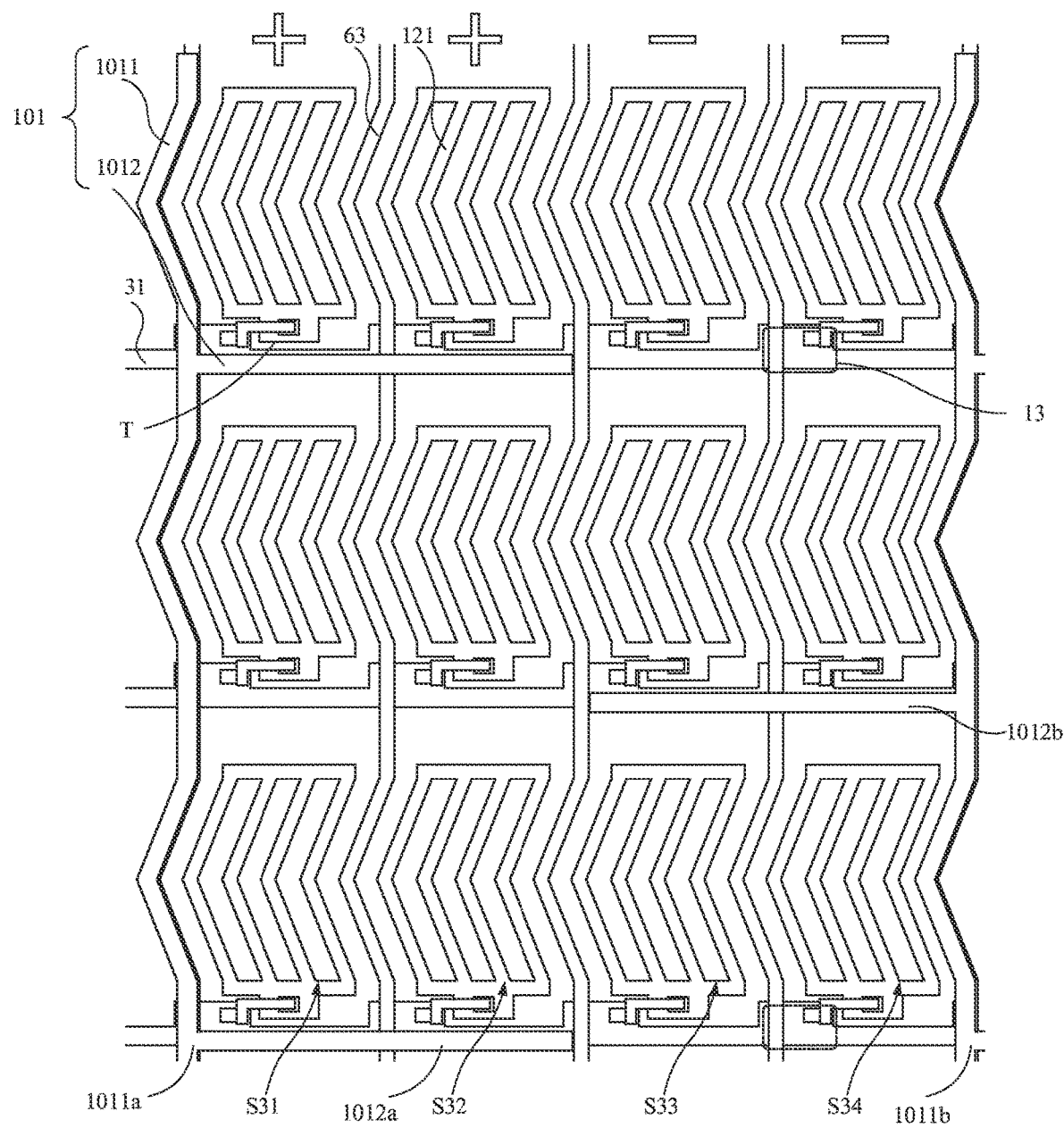
FIG. 4 is a partial enlarged schematic view of portion A in FIG. 2.
Figure 5:
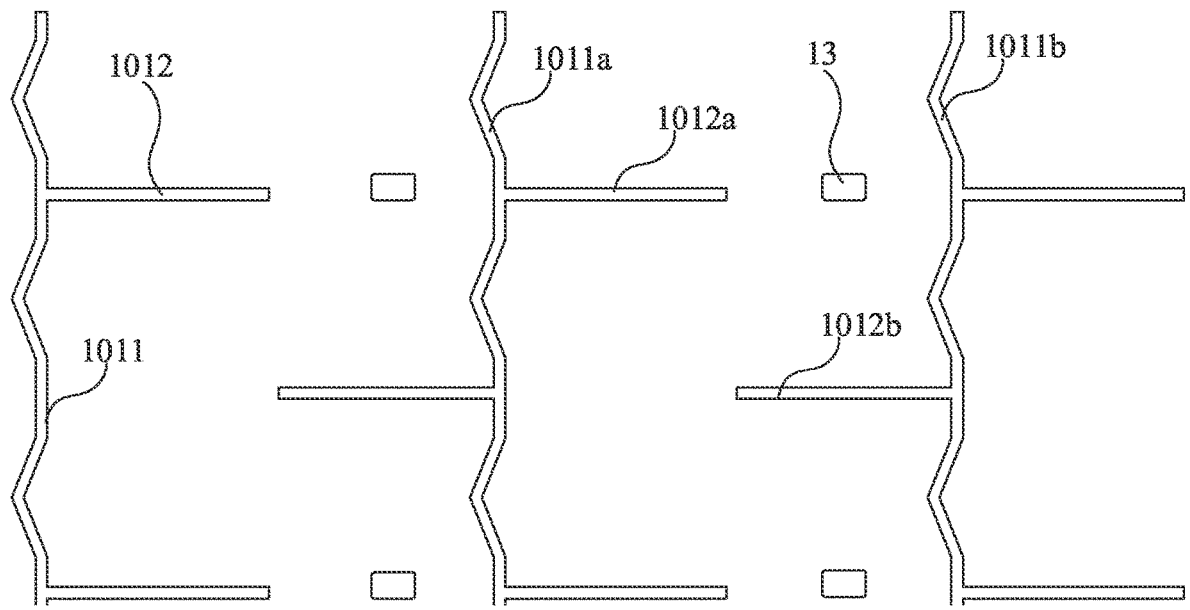
FIG. 5 is a schematic view illustrating a positional relationship between the auxiliary conductive patterns and the spacers in FIG. 2.
Figure 6:
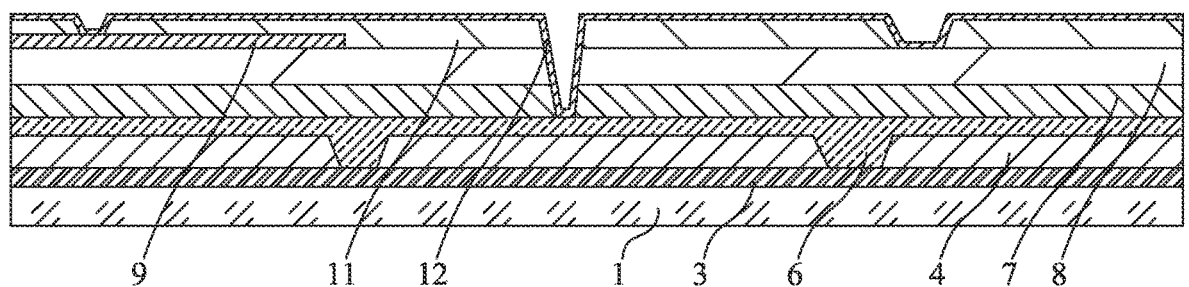
FIG. 6 is a schematic cross-sectional view of the first substrate in the non-display area of FIG. 5.

Referring to FIGS. 4 and 5, the auxiliary conductive lines 101 of the auxiliary conductive patterns 10 in the display area S1 comprise a plurality of trunk portions 1011 extending in the second direction and a plurality of extension portions 1012 extending in the first direction. The extension portions 1012 are connected to the trunk portions 1011.

The trunk portion 1011 covers at least a portion of the adjacent data line 63. An extending direction of the trunk portion 1011 is same as an extending direction of the data line 63. By overlapping the trunk portion 1011 with the data line 63, the present application can further shield a voltage interference of the data line 63.

In addition, an edge line on one side of the trunk portion 1011 is parallel to an edge line of the data line 63. One edge line on one side of the trunk portion 1011 and an adjacent edge line of the data line 63 are separated by a distance in the first direction. A lateral edge of the trunk portion 1011 extends beyond a lateral edge of the data line 63 in the first direction, so that the trunk portion 1011 completely covers the lateral edge of the data line 63. That is, an orthographic projection of the edge line of the trunk portion 1011 projected on a plane where the data line 63 is disposed is outside the data line 63, and light leakage at edges of the data line 63 is shielded by means of a light shielding ability of the auxiliary conductive pattern 10 so as to reduce color mixing. In the present embodiment, edge lines on two sides of the trunk portion 1011 can exceed edge lines on two sides of the data line 63. The trunk portion 1011 completely covers the data line 63. Orthographic projections of the edge lines on two sides of the trunk portion 1011 on the plane where the data line 63 is disposed are all located outside the data line 63, so as to better improve the display quality of the display panel.

The extension portion 1012 covers at least a portion of the adjacent scan line 31. An extending direction of the extension portion 1012 is same as an extending direction of the scan line 31. The extension portion 1012 is overlapped with the scan line 31 to reduce an influence on the aperture ratio of the display panel. In the present embodiment, an orthographic projection of a connection portion between the extension portion 1012 and the trunk portion 1011 projected on the first substrate 1 overlaps an orthographic projection of an intersection of the scan line 31 and the data line 63 projected on the first substrate 1.

As shown in FIG. 5, the spacers 13 are staggered with respect to the auxiliary conductive patterns 10. That is, the orthographic projections of the spacers 13 projected on the plane where the auxiliary conductive patterns 10 are disposed are located outside the auxiliary conductive patterns 10. Also referring to FIG. 1, the above design can effectively prevent the spacers 13 from shifting and misalignment at the edges of the auxiliary conductive patterns 10, thereby improving the display reliability of the display panel.

In the present embodiment, the spacers 13 are disposed corresponding to the thin film transistors T. Specifically, the orthographic projection of the spacer 13 projected on the first substrate 1 overlaps an orthographic projection of the thin film transistor T projected on the first substrate 1 to minimize the influence of the spacer 13 on the aperture ratio of the display panel.

Optionally, the auxiliary conductive lines 101 and the spacers 13 are alternately arranged along the extending direction of the scan lines 31.

With reference to FIGS. 4 and 5, the auxiliary conductive lines 101 of the auxiliary conductive patterns 10 located in the display area S1 comprises a plurality of first extension portions 1012a and a plurality of second extension portions 1012b extending in the first direction. The first extension portion 1012a and the second extension portion 1012b are adjacently arranged along the second direction. The auxiliary conductive lines 101 further comprise a plurality of first trunk portions 1011a and a plurality of second trunk portions 1011b extending in the second direction. The first trunk portion 1011a and the second trunk portion 1011b are adjacently arranged along the first direction.

One end of the first extension portion 1012a is connected to the first trunk portion 1011a. Another end of the first extension portion 1012a extends toward the second trunk portion 1011b. The another end of the first extension portion 1012a is disconnected from the second trunk portion 1011b and is a free end.

One end of the second extension portion 1012b is connected to the second trunk portion 1011b. Another end of the second extension portion 1012b extends towards the first trunk portion 1011a. The another end of the second extension portion 1012b is disconnected from the first trunk portion 1011a and is as a free end.

Between the adjacent first trunk portion 1011a and the second trunk portion 1011b, the first extension portions 1012a and the second extension portions 1012b are alternately arranged along the second direction. Therefore, the extension portions 1012 can be evenly distributed between the first trunk portion 1011a and the second trunk portion 1011b, thereby ensuring that the auxiliary conductive patterns 10 are uniformly distributed in the display area S1.

Between the first trunk portion 1011a and the second trunk portion 1011b disposed adjacent to each other, the orthographic projections of the spacers 13, projected on the plane where the auxiliary conductive patterns 10 are disposed, and the second extension portions 1012b are alternately arranged along the second direction, so that the present application ensures that the spacers 13 are arranged as uniformly as possible while ensuring that the spacers 13 are staggered with respect to the auxiliary conductive patterns 10.

In the first direction, 2n sub-pixel regions S3 are arranged between two adjacent trunk portions 1011, and n is a natural number greater than or equal to 1, wherein a driving voltage applied to the n consecutive sub-pixel regions S3 close to one of the trunk portions 1011 has the same polarity; and a driving voltage applied to the n consecutive sub-pixel regions S3 close to the other trunk portion 1011 have the same polarity, and the polarity is opposite to the polarity of the driving voltage applied to the other n consecutive sub-pixel regions S3. Therefore, a width of the extension portion 1012 is between a sum of widths of the (n−1) sub-pixel regions S3 and a sum of widths of the (n+1) sub-pixel regions S3. That is, the extension portion 1012 extends along the extending direction of the scan line 31 to a middle position between two adjacent trunk portions 1011 to ensure that the extension portion 1012 can accurately compensate a loss caused by resistance in a portion of the common electrode 91 corresponding to the pixel electrode 121 supplied with the driving voltage of the same polarity.

Specifically, in the present embodiment shown in FIG. 4, along the extending direction of the scan line 31, four sub-pixel regions S3 are arranged between the first trunk portion 1011a and the second trunk portion 1011b. In detail, a first sub-pixel S31, a second sub-pixel S32, a third sub-pixel S33, and a fourth sub-pixel S34 are sequentially arranged between the first trunk portion 1011a and the second trunk portion 1011b. A polarity of a driving voltage applied to the first sub-pixel S31 and the second sub-pixel S32 is opposite to a polarity of a driving voltage applied to the third sub-pixel S33 and the fourth sub-pixel S34. That is, the display panel adopts a two-line or four-line inversion driving mode.

A length of the extension portion 1012 along the first direction is less than or equal to half of a distance between two adjacent trunk portions 1011.

Optionally, the free end of the first extension portion 1012a and/or the free end of the second extension portion 1012b does not exceed the data line 63 located between the second sub-pixel S32 and the third sub-pixel S33 in the first direction. The width of the first extension 1012a is slightly less than or equal to a sum of a width of the first sub-pixel S31 and a width of the second sub-pixel S32. The first extension portion 1012a can reduce a loss caused by the resistance of the common electrode 91 in the first sub-pixel S31 and the second sub-pixel S32 supplied with the driving voltage of the same polarity. The second extension portion 1012b can reduce the loss caused by the resistance of the common electrode 91 in the third sub-pixel S33 and the fourth sub-pixel S34 supplied with the driving voltage of the same polarity.

The orthographic projection of the spacer 13 projected on the plane where the auxiliary conductive patterns 10 are disposed is located between the free end of the first extension portion 1012a and the second trunk portion 1011b. The orthographic projection of the spacer 13 projected on the plane where the auxiliary conductive patterns 10 are disposed is located in a middle area between the free end of the first extension portion 1012a and the second trunk portion 1011b to ensure that the spacer 13 is separated from the auxiliary conductive pattern 10 by a sufficient distance. It can be understood that the orthographic projection of the spacer 13 projected on the plane where the auxiliary conductive patterns 10 are located can also be located in other areas that do not overlap with the auxiliary conductive pattern 10. For example, the orthographic projection of the spacer 13 projected on the plane where the auxiliary conductive patterns 10 are disposed can also be located between the free end of the second extension portion 1012b and the first trunk portion 1011a, and the present application is not limited in this regard. In the present embodiment, it is preferable to arrange the spacer 13 corresponding to the scan line 31 and/or the thin film transistor T in order not to affect the aperture ratio as much as possible.

It can be understood that the auxiliary conductive pattern 10 can also be other patterns/shapes, as long as it is ensured that the auxiliary conductive pattern 10 does not overlap with the spacer 13, and the present application is not limited in this regard. While not affecting the aperture ratio of the display panel, the larger an area of the auxiliary conductive pattern 10 in the display area S1, the more effective it is to reduce the resistance of the common electrode 91. The more uniform the auxiliary conductive patterns 10 in the display area S1 are distributed, the more uniform the voltages of the common electrodes 91 are.

In the present embodiment, the passivation layer 11 is disposed on the common electrode layer 9 and the auxiliary conductive pattern 10, and the pixel electrode layer 12 is disposed on the passivation layer 11. The orthographic projections of the spacers 13 projected on the passivation layer 11 and the orthographic projections of the auxiliary conductive patterns 10 projected on the passivation layer 11 do not overlap. It can be understood that in other specific embodiments of the present application, the pixel electrode 121 can also be disposed under the common electrode 91, and the present application is not limited in this regard.

Figure 7:
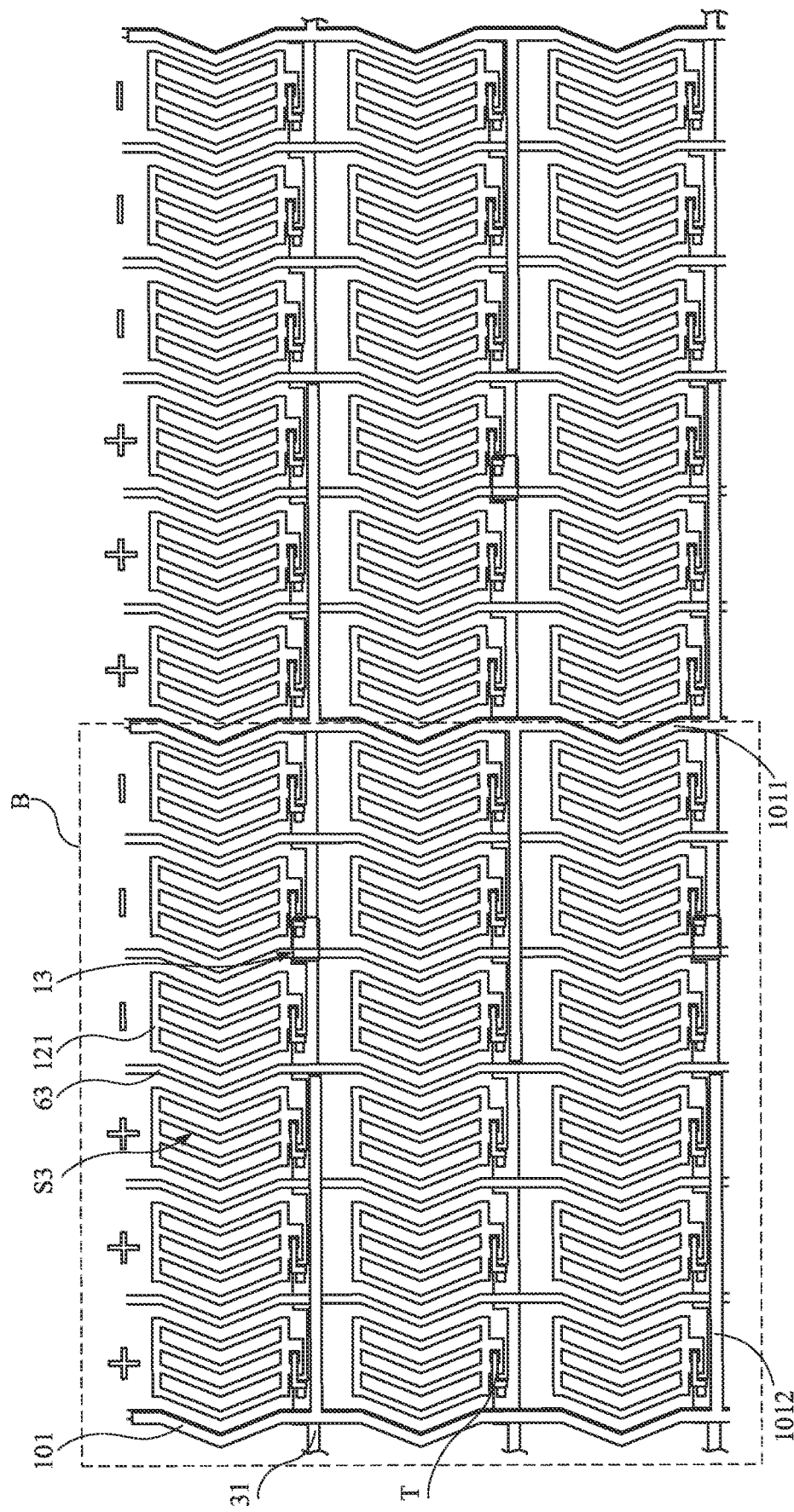
FIG. 7 is a schematic top view of the display area of the display panel according to a second embodiment of the present application.
Figure 8:
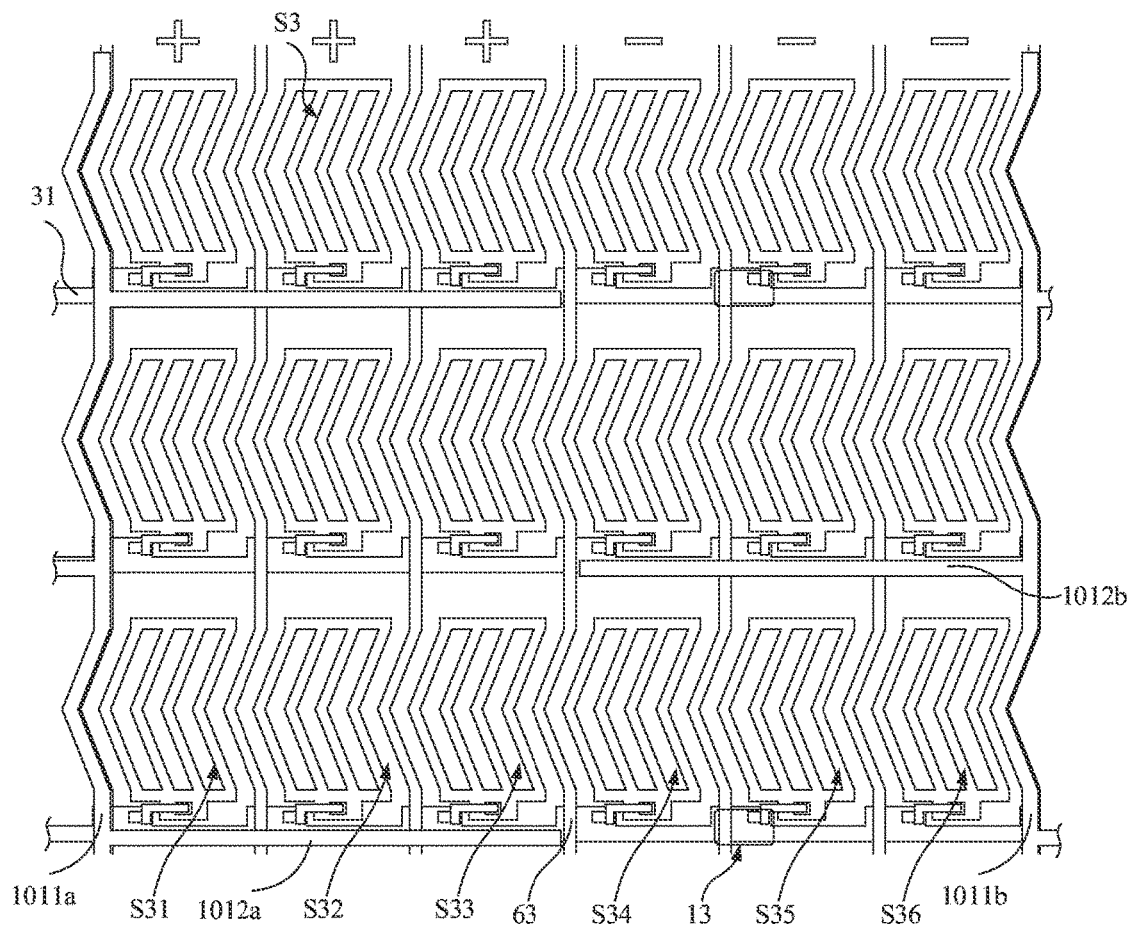
FIG. 8 is a partial enlarged view of portion B in FIG. 7.
Figure 9:
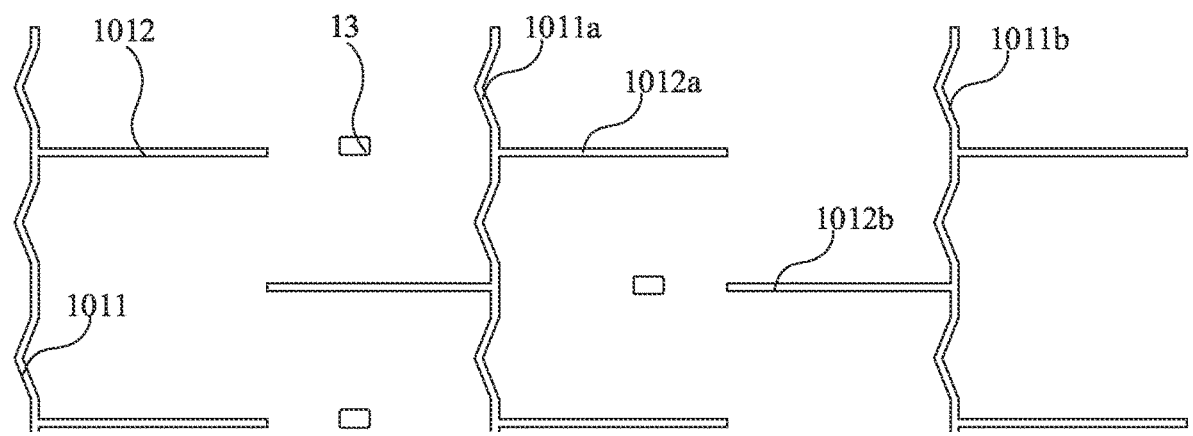
FIG. 9 is a schematic view illustrating a positional relationship between the auxiliary conductive patterns and the spacers in FIG. 7.

The second embodiment of the display panel provided by the present application is shown in FIG. 7 to FIG. 9. The difference between the second embodiment and the first embodiment is that the display panel adopts a three-line or six-line inversion driving mode. Accordingly, the distance between the auxiliary conductive lines 101 in the auxiliary conductive patterns 10 located in the display area S1 are also adjusted adaptively.

Specifically, as shown in FIGS. 7 and 8, along the extending direction of the scan lines 31, six sub-pixel regions S3 are disposed between the first trunk portion 1011a and the second trunk portion 1011b. In detail, a first sub-pixel S31, a second sub-pixel S32, a third sub-pixel S33, a fourth sub-pixel S34, a fifth sub-pixel S35, and a sixth sub-pixel S36 are sequentially arranged between the first trunk portion 1011a and the second trunk portion 1011b. A polarity of a driving voltage applied to the first sub-pixel S31, the second sub-pixel S32, and the third sub-pixel S33 is opposite to a polarity of a driving voltage applied to the fourth sub-pixel S34, the fifth sub-pixel S35, and the sixth sub-pixel S36.

Accordingly, the length of the extension portion 1012 along the first direction is less than or equal to half of the distance between two adjacent trunk portions 1011.

Optionally, the free end of the first extension portion 1012a and/or the free end of the second extension portion 1012b does not exceed the data line 63 located between the third sub-pixel S33 and the fourth sub-pixel S34 in the first direction. Along the first direction, the length of the first extension 1012a is slightly less than or equal to a sum of the widths of the first sub-pixel S31, the second sub-pixel S32 and the third sub-pixel S33. The first extension portion 1012a can reduce the loss caused by the resistance of the common electrode 91 in an area of the first sub-pixel S31 to the third sub-pixel S33 supplied with the driving voltages of the same polarity. The second extension portion 1012b can reduce the loss caused by the resistance of the common electrode 91 in an area of the fourth sub-pixel S34 to the sixth sub-pixel S36 supplied with the driving voltage of the same polarity.

The orthographic projection of the spacer 13 projected on the plane where the auxiliary conductive patterns 10 are disposed is located between the free end of the first extension portion 1012a and the second trunk portion 1011b. The orthographic projection of the spacer 13 projected on the plane where the auxiliary conductive patterns 10 are disposed is located in the middle area between the free end of the first extension portion 1012a and the second trunk portion 1011b to ensure that the spacer 13 is separated from the auxiliary conductive pattern 10 by a sufficient distance.

Between the first trunk portion 1011a and the second trunk portion 1011b adjacent to each other, the orthographic projections of the spacers 13, projected on the plane where the auxiliary conductive patterns 10 are disposed, and the second extension portions 1012b are alternately arranged along the second direction. Optionally, the orthographic projections of the spacers 13, projected on the plane where the auxiliary conductive patterns 10 are disposed, and the second extension portions 1012b are also alternately arranged along the second direction at the same time. Through such configuration, the present application ensures that the spacers 13 are arranged as uniformly as possible while ensuring that the spacers 13 are staggered with respect to the auxiliary conductive patterns 10.

Other structures of the present embodiment are same as the first embodiment, and a detailed description is omitted herein for brevity.

It can be understood that, in the embodiments listed in the present application, the first direction is the same as the extending direction of the scan lines, which is a traverse direction. The second direction is the same as the extending direction of the data lines, which is a longitudinal direction. However, in other embodiments of the present application, the first direction can also be different from the extending direction of the scan lines, and the second direction can also be different from the extending direction of the data lines, as long as the first direction and the second direction can intersect. Optionally, the extending direction of the trunk portions of the auxiliary conductive pattern can be different from the extending direction of the data lines, and the extending direction of the extension portions of the auxiliary conductive patterns can also be different from the extending direction of the scan lines, as long as the extending direction of the trunk portions of the auxiliary conductive patterns intersect the extending direction of the scan lines. In the above embodiment, the extending directions of the auxiliary conductive patterns being different from the extending directions of the scan lines and the data lines may reduce an overlapping area of the auxiliary conductive patterns with the scan lines and the data lines, and thereby reduce light transmittance and signal shielding ability of the display panel. However, the design of the auxiliary conductive patterns has higher flexibility, and the IR-drop of the common electrode can be better alleviated by differentiating among some areas. At the same time, the auxiliary conductive patterns can be adjusted to better compensate for pixel driving signals.

It can be understood that in other embodiments of the present application, the thin film transistor T can also be a bottom gate thin film transistor, a double gate thin film transistor, a top gate thin film transistor, and the like, and the present application is not limited in this regard.

It can be understood that, in other embodiments of the present application, the pixel electrode 121 can also have other shape such as a "union jack" shape, a comb shape, a plate shape, etc., and the present application is not limited in this regard.

The present application further provides a display device comprising a backlight module and a display panel as described above, and the display panel is connected to the backlight module.

In the present application, the spacers are staggered with respect to the auxiliary conductive patterns to ensure that the orthographic projections of the spacers projected on the plane where the auxiliary conductive patterns are disposed do not overlap with the auxiliary conductive patterns, thereby preventing shifting and misalignment of the spacers at the edges of the auxiliary conductive patterns, thus improving the display reliability of the display panel.

The above is a detailed description to the display panel and the display device of the present application. Specific examples are used in the present disclosure to illustrate working principles and embodiments of the present application. The description of the above embodiments is only used for ease of understanding the method and main ideas of the present application. Those skilled in the art can modify the specific embodiments and their applications according to the ideas of the present application. In summary, the content of the specification should not be understood as restrictions on the present application.

What is claimed is:

1. A display panel, comprising:
   a first substrate and a second substrate arranged opposite to each other;
   a plurality of thin film transistors arranged on the first substrate;
   a common electrode layer arranged on the thin film transistors;
   a plurality of auxiliary conductive patterns disposed on the common electrode layer, wherein the auxiliary conductive patterns are connected to the common electrode layer;
   a pixel electrode layer electrically insulated from the common electrode layer and the auxiliary conductive patterns, wherein the pixel electrode layer is connected to the thin film transistors; and
   a plurality of spacers arranged between the first substrate and the second substrate, wherein the spacers are staggered with respect to the auxiliary conductive patterns,
   wherein a plurality of scan lines and a plurality of data lines are disposed on the first substrate, the scan lines and the data lines cross each other to define a plurality of sub-pixel regions, the pixel electrode layer comprises a plurality of pixel electrodes in the sub-pixel regions, a gate of each thin film transistor is connected to the corresponding scan line, a source of each thin film transistor is connected to the corresponding data line, and a drain of each thin film transistor is connected to the corresponding pixel electrode; and
   wherein orthographic projections of the auxiliary conductive patterns projected on the first substrate are located outside orthographic projections of the pixel electrodes projected on the first substrate, wherein auxiliary conductive patterns comprise:
   a plurality of first trunk portions and a plurality of second trunk portions extending along an extending direction of the data lines, wherein the first trunk portions and the second trunk portions are arranged adjacent to each other; and
   a plurality of first extension portions and a plurality of second extension portions extending along an extending direction of the scan lines, wherein one end of each first extension portion is connected to the corresponding first trunk portion, a free end of each first extension portion extends toward the corresponding second trunk portion, one end of each second extension portion is connected to the corresponding second trunk portion, and a free end of each second extension portion extends towards the corresponding first trunk portion,
   wherein four sub-pixels are arranged between each first trunk portion and the corresponding second trunk portion along the extending direction of the scan lines, and the four sub-pixels comprise a first sub-pixel, a second sub-pixel, a third sub-pixel, and a fourth sub-pixel arranged in sequence between each first trunk portion and the corresponding second trunk portion; a polarity of a driving voltage applied on the first sub-pixel and the second sub-pixel is opposite to a polarity of a driving voltage applied on the third sub-pixel and the fourth sub-pixel; and the free ends of the first extension portions and/or the free ends of the second extension portions do not extend beyond the data lines located between the second sub-pixels and the third sub-pixels in the extending direction of the scan lines.

2. The display panel according to claim 1, further comprising:
   a passivation layer disposed on the common electrode layer and the auxiliary conductive patterns, wherein the passivation layer covers the common electrode layer and the auxiliary conductive patterns, and the pixel electrode layer is disposed on the passivation layer; and
   wherein orthographic projections of the spacers projected on the passivation layer are located outside orthographic projections of the auxiliary conductive patterns projected on the passivation layer.

3. The display panel according to claim 1, wherein each of the auxiliary conductive patterns comprises a trunk portion extending along an extending direction of the data lines, and each of the trunk portions covers at least a portion of the adjacent data line.

4. The display panel according to claim 3, wherein each of the auxiliary conductive patterns further comprises an extension portion extending along an extending direction of the scan lines, the extension portions are connected to the trunk portions, each extension portion covers at least a portion of the adjacent scan line, and the auxiliary conductive patterns and the spacers are alternately arranged along the extending direction of the scan lines.

5. The display panel according to claim 4, wherein the spacers are arranged corresponding to the thin film transistors, and the extension portions and the spacers are alternately arranged along the extending direction of the data lines.

6. The display panel according to claim 4, wherein 2n sub-pixels are arranged between two adjacent trunk portions along the extending direction of the scan lines, a width of each extension portion is greater than a sum of widths of (n−1) sub-pixel regions, and the width of each extension portion is less than a sum of widths of (n+1) sub-pixel regions.

7. The display panel according to claim 1, wherein the auxiliary conductive patterns comprise:
a plurality of first trunk portions and a plurality of second trunk portions extending along an extending direction of the data lines, wherein the first trunk portions and the second trunk portions are arranged adjacent to each other;
a plurality of first extension portions and a plurality of second extension portions extending along an extending direction of the scan lines, wherein one end of each first extension portion is connected to the corresponding first trunk portion, a free end of each first extension portion extends toward the corresponding second trunk portion, one end of each second extension portion is connected to the corresponding second trunk portion, and a free end of each second extension portion extends toward the corresponding first trunk portion;
wherein six sub-pixels are arranged between each first trunk portion and the corresponding second trunk portion along the extending direction of the scan lines, and the six sub-pixels comprise a first sub-pixel, a second sub-pixel, a third sub-pixel, a fourth sub-pixel, a fifth sub-pixel, and a sixth sub-pixel arranged in sequence between each first trunk portion and the corresponding second trunk portion; a polarity of a driving voltage applied to the first sub-pixel, the second sub-pixel, and the third sub-pixel is opposite to a polarity of a driving voltage applied to the fourth sub-pixel, the fifth sub-pixel, and the sixth sub-pixel; and the free ends of the first extension portions and/or the free ends of the second extension portions do not extend beyond the data lines located between the third sub-pixels and the fourth sub-pixels in the extending direction of the scan lines.

8. The display panel according to claim 1, wherein the auxiliary conductive patterns comprise:
a plurality of first extension portions and a plurality of second extension portions extending in a first direction; and
direction, wherein the first trunk portions and the second trunk portions are disposed adjacent to each other, and the first direction and the second direction crosses each other; and
wherein one end of each first extension portion is connected to the corresponding first trunk portion, and another end of each first extension portion is close to and disconnected from the corresponding second trunk portion; one end of each second extension portion is connected to the corresponding second trunk portion, and another end of the second extension portion is close to and disconnected from the corresponding first trunk portion; and the first extension portions and the second extension portions are alternately arranged along the second direction.

9. The display panel according to claim 8, wherein an orthographic projection of each of the spacers projected on a plane where the auxiliary conductive patterns are disposed is located between a free end of the corresponding first extension portion and the corresponding second trunk portion; and/or
an orthographic projection of each of the spacers projected on the plane where the auxiliary conductive patterns are disposed is located between a free end of the corresponding second extension portion and the corresponding first trunk portion.

10. The display panel according to claim 1, wherein the display panel comprises a display area and a non-display area, and the auxiliary conductive patterns comprise:
a plurality of auxiliary conductive lines located in the display area, wherein the auxiliary conductive lines extend along a first direction and/or a second direction, and the first direction crosses the second direction; and
a connection bus line disposed in the non-display area, wherein the connection bus line is connected to the auxiliary conductive lines.

11. A display device, comprising a backlight module and a display panel, the display device comprising:
a first substrate and a second substrate arranged opposite to each other;
a plurality of thin film transistors arranged on the first substrate;
a common electrode layer arranged on the thin film transistors;
a plurality of auxiliary conductive patterns disposed on the common electrode layer, wherein the auxiliary conductive patterns are connected to the common electrode layer;
a pixel electrode layer electrically insulated from the common electrode layer and the auxiliary conductive patterns, wherein the pixel electrode layer is connected to the thin film transistors; and
a plurality of spacers arranged between the first substrate and the second substrate, wherein the spacers are staggered with respect to the auxiliary conductive patterns,
wherein a plurality of scan lines and a plurality of data lines are disposed on the first substrate, the scan lines and the data lines cross each other to define a plurality of sub-pixel regions, the pixel electrode layer comprises a plurality of pixel electrodes in the sub-pixel regions, a gate of each thin film transistor is connected to the corresponding scan line, a source of each thin film transistor is connected to the corresponding data line, and a drain of each thin film transistor is connected to the corresponding pixel electrode; and
wherein orthographic projections of the auxiliary conductive patterns projected on the first substrate are located outside orthographic projections of the pixel electrodes projected on the first substrate, wherein auxiliary conductive patterns comprise:
a plurality of first trunk portions and a plurality of second trunk portions extending along an extending direction of the data lines, wherein the first trunk portions and the second trunk portions are arranged adjacent to each other; and a plurality of first extension portions and a plurality of second extension portions extending along an extending direction of the scan lines, wherein one end of each first extension portion is connected to the corresponding first trunk portion, a free end of each first extension portion extends toward the corresponding second trunk portion, one end of each second extension portion is connected to the corresponding second trunk portion, and a free end of each second extension portion extends towards the corresponding first trunk portion;

wherein four sub-pixels are arranged between each first trunk portion and the corresponding second trunk portion along the extending direction of the scan lines, and the four sub-pixels comprise a first sub-pixel, a second sub-pixel, a third sub-pixel, and a fourth sub-pixel arranged in sequence between each first trunk portion and the corresponding second trunk portion; a polarity of a driving voltage applied on the first sub-pixel and the second sub-pixel is opposite to a polarity of a driving voltage applied on the third sub-pixel and the fourth sub-pixel; and the free ends of the first extension portions and/or the free ends of the second extension portions do not extend beyond the data lines located between the second sub-pixels and the third sub-pixels in the extending direction of the scan lines; and wherein the display panel is connected to the backlight module.

12. The display device according to claim 11, wherein a plurality of scan lines and a plurality of data lines are disposed on the first substrate, the scan lines and the data lines cross each other to define a plurality of sub-pixel regions, the pixel electrode layer comprises a plurality of pixel electrodes in the sub-pixel regions, a gate of each thin film transistor is connected to the corresponding scan line, a source of each thin film transistor is connected to the corresponding data line, and a drain of each thin film transistor is connected to the corresponding pixel electrode; and orthographic projections of the auxiliary conductive patterns projected on the first substrate are located outside orthographic projections of the pixel electrodes projected on the first substrate.

13. The display device according to claim 12, wherein each of the auxiliary conductive patterns comprises a trunk portion extending along an extending direction of the data lines, and each of the trunk portions covers at least a portion of the adjacent data line.

14. The display device according to claim 13, wherein each of the auxiliary conductive patterns further comprises an extension portion extending along an extending direction of the scan lines, the extension portions are connected to the trunk portions, each extension portion covers at least a portion of the adjacent scan line, and the auxiliary conductive patterns and the spacers are alternately arranged along the extending direction of the scan lines.

15. The display device according to claim 14, wherein the spacers are arranged corresponding to the thin film transistors, and the extension portions and the spacers are alternately arranged along the extending direction of the data lines.

16. The display device according to claim 11, wherein an orthographic projection of each of the spacers projected on a plane where the auxiliary conductive patterns are disposed is located between a free end of the corresponding first extension portion and the corresponding second trunk portion.

17. The display device according to claim 11, an orthographic projection of each of the spacers projected on a plane where the auxiliary conductive patterns are disposed is located between a free end of the corresponding second extension portion and the corresponding first trunk portion.

* * * * *